United States Patent
Markovich

(10) Patent No.: US 9,641,495 B2
(45) Date of Patent: May 2, 2017

(54) METHOD FOR USER IDENTIFICATION

(75) Inventor: Slavik Markovich, Los Altos, CA (US)

(73) Assignee: MCAFEE, INC., Santa Clara, CA (US)

( * ) Notice: Subject to any disclaimer, the term of this patent is extended or adjusted under 35 U.S.C. 154(b) by 1657 days.

(21) Appl. No.: 12/285,739

(22) Filed: Oct. 14, 2008

(65) Prior Publication Data
US 2009/0112885 A1 Apr. 30, 2009

Related U.S. Application Data

(60) Provisional application No. 60/982,467, filed on Oct. 25, 2007.

(51) Int. Cl.
| | | |
|---|---|---|
| *G06F 17/30* | (2006.01) | |
| *H04L 29/06* | (2006.01) | |
| *G06Q 10/06* | (2012.01) | |
| *H04L 29/08* | (2006.01) | |

(52) U.S. Cl.
CPC ............ *H04L 63/08* (2013.01); *G06Q 10/06* (2013.01); *H04L 67/142* (2013.01)

(58) Field of Classification Search
USPC .............. 709/201–203, 217–219, 227–231
See application file for complete search history.

(56) References Cited

U.S. PATENT DOCUMENTS

| | | | |
|---|---|---|---|
| 5,826,270 A | | 10/1998 | Rutkowski et al. |
| 6,442,552 B1 * | | 8/2002 | Frolund et al. ............... 707/613 |
| 6,859,527 B1 * | | 2/2005 | Banks .................... H04L 29/06 |
| | | | 370/352 |
| 6,986,060 B1 * | | 1/2006 | Wong .............................. 726/26 |
| 7,406,523 B1 * | | 7/2008 | Kruy et al. .................... 709/227 |
| 8,015,233 B2 | | 9/2011 | Li et al. |
| 8,694,788 B1 * | | 4/2014 | Thomas .................. H04L 63/08 |
| | | | 713/165 |
| 2003/0050961 A1 * | | 3/2003 | Rodriguez et al. ........... 709/203 |
| 2003/0221000 A1 * | | 11/2003 | Cherkasova ............ H04L 67/24 |
| | | | 709/224 |
| 2003/0233461 A1 * | | 12/2003 | Mariblanca-Nieves et al. ............................. 709/228 |
| 2005/0144276 A1 | | 6/2005 | Bird et al. |
| 2005/0234926 A1 | | 10/2005 | Warner |
| 2005/0278276 A1 | | 12/2005 | Andreev et al. |
| 2007/0047530 A1 | | 3/2007 | Ayers et al. |
| 2007/0204342 A1 | | 8/2007 | Markovich et al. |
| 2009/0089681 A1 | | 4/2009 | Gottipati et al. |
| 2009/0112981 A1 | | 4/2009 | Markovich |

FOREIGN PATENT DOCUMENTS

WO 2007096890 8/2007

OTHER PUBLICATIONS

Office Action of U.S. Appl. No. 12/285,747, mailed May 21, 2010, 11 pages.
Final Office Action of U.S. Appl. No. 12/285,747, mailed Dec. 28, 2010, 16 pages.

(Continued)

*Primary Examiner* — Abdullahi E Salad
(74) *Attorney, Agent, or Firm* — Shichrur & Co.

(57) ABSTRACT

A method for user identification, the method comprising relaying an identifier of an application server user to a database associated with the application server, wherein the relaying is performed via a transaction request from the application server to the database.

15 Claims, 5 Drawing Sheets

(56) References Cited

OTHER PUBLICATIONS

Office Action of U.S. Appl. No. 12/285,747, mailed Feb. 28, 2012, 23 pages.
Application Server Matrix, The Server Side, theserverside.com, last update: Mar. 27, 2005, report retrieved on Oct. 22, 2007, 6 pages, http://www.theserverside.com/tt/articles/content/ServerMatrix/matrix_print.html.
Comparison of application servers, from Wikipedia, en.wikipedia.org, page last modified on Oct. 17, 2007, report retrieved on Oct. 22, 2007, 4 pages, http://en.wikipedia.org/w/index.php?title=Comparison_of_application_servers.
The Essentials of Filters, Sun Developer Network (SDN), Sun Microsystems Inc., retrieved Oct. 18, 2007, 8 pages, http://java.sun.com/products/servlet/Filters.html.
Propagating Middle-Tier and Application Users to the DBMS (Part 1 of 3), Musings on Database Security, Slavik's Blog, slaviks-blog.com, retrieved May 22, 2007, 5 pages, http://www.slaviks-blog.com/2007/05/22/propagating-middle-tier-and-application-users-to-the-dbms-part-1-of-3/.
Propagating Middle-Tier and Application Users to the DBMS (Part 2 of 3), Musings on Database Security, Slavik's Blog, slaviks-blog.com, retrieved Jun. 10, 2007, 10 pages, http://www.slaviks-blog.com/2007/06/10/propagating-middle-tier-and-application-users-to-the-dbms-part-2-of-3/.
Venkatasubramaniam et al., Chapter 30, End-To-End Metrics Support, Oracle Database JDBC Developer's Guide and Reference, 10g Release 2 (10.2), B14355-04, Mar. 2010, 3 pages.
Venkatasubramaniam et al., Oracle Database JDBC Developer's Guide and Reference, 10g Release 2 (10.2), B14355-02, May 2006, 484 pages.
B. Clifford Neuman et al., "Kerberos: An Authentication Service for Computer Networks", IEEE Communications Magazine, Sep. 1994, pp. 33-38, 6 pages.

* cited by examiner

METHOD FOR USER IDENTIFICATION

CROSS-REFERENCE TO RELATED APPLICATIONS

This application claims the benefit of U.S. Provisional Patent Application No. 60/982,467 filed Oct. 25, 2007, the entire disclosure of which is incorporated herein by reference.

FIELD OF THE DISCLOSURE

Embodiments of the disclosure relate to a method for user identification.

BACKGROUND

A database (or a "DB" for short) is a computerized tool for storing digital data in an orderly manner. A database is often physically stored in a memory which allows direct access to data, such as a magnetic hard drive or a flash memory device. Access to the data is usually performed using designated software often referred to as a "database management system" (DBMS), commonly coupled to the database itself and, therefore, sometimes considered as a part of the term "database".

Databases may be used by a user directly, but are often accessed through a software intermediary (or a "middleware"), which is sometimes referred to as an application server. An application server commonly includes a user interface coupled to a software engine to handle the application server's business logic and functional characteristics. An application server also usually includes means for interfacing with a database which stores its pertinent data.

Applicant's U.S. Published Patent Application No. 2007/0204342 and PCT Published Patent Application WO2007/096890 disclose a database intrusion detection sensor. U.S. Published Patent Application No. 2005/0234926 to Warner discloses a method to support authentication and authorization of a web application user to a database, management system in web server based data-driven applications.

SUMMARY

There is provided, according to an embodiment, a method for user identification, the method comprising relaying an identifier of an application server user to a database associated with the application server, wherein the relaying is performed via a transaction request from the application server to the database.

There is further provided, according to an embodiment, a method for database security, the method comprising attaching an identifier of an application server user to a transaction request from the application server to a database associated with the application server; and receiving the transaction request and the identifier at the database.

There is further provided, according to an embodiment, a method for user identification, the method comprising relaying an identifier of a rich client user to a database associated with the rich client, wherein the relaying is performed via a transaction request from the rich client to the database.

In some embodiments, the identifier is selected from a group consisting of: an Internet Protocol (IP) address, a login name, a Uniform Resource Locator (URL), a HyperText Transfer Protocol (HTTP) request method and a user environment variable.

In some embodiments, the method further comprises intercepting the identifier using an interface filter.

In some embodiments, the method further comprises attaching the identifier to the transaction request using an outgoing filter.

In some embodiments, the attaching of the identifier to the transaction request comprises implanting the identifier in an end-to-end metric of the transaction request.

In some embodiments, the attaching of the identifier to the transaction request comprises implanting the identifier in a connection property of the transaction request.

In some embodiments, the attaching of the identifier to the transaction request comprises implanting the identifier as a note in a Structured Query Language (SQL) query.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

Figure 1A:
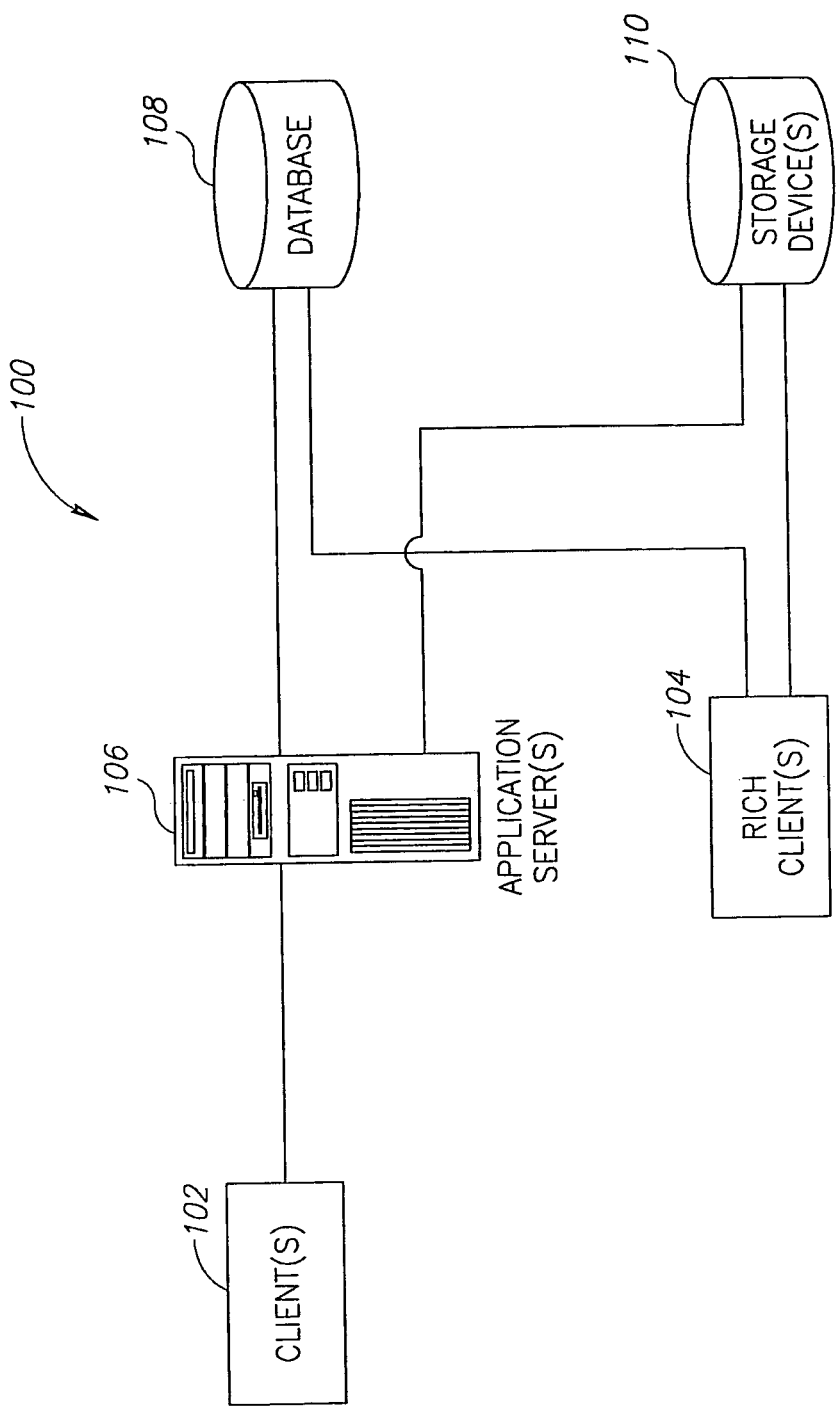
FIG. 1A schematically shows a network diagram, in accordance with an embodiment of the disclosure.

An aspect of some embodiments relates to a system and a method for user identification, including relaying of information pertaining to a user of an application server to a database associated with the application server. This information may be used by the database and/or one or more software application(s) essentially coupled to it, for purposes such as database transaction auditing and security monitoring, as well as other purposes.

Users often connect to application servers in order to perform various operations supported by these servers. An application server may run software used for purposes such as financial or account management, customer relations management (CRM), project management, business inventory management, various web services, e-commerce and/or the like. An application server may be viewed as an essentially centralized software application remotely accessible by end-users over a communication channel. In contrast, decentralized configurations often include individual software applications installed on each user's personal computer.

Centralizing software resources is said to have a number of benefits. It usually spares the need to install individual software applications on end-users' personal computers. It often further allows system administrators to perform software updates on essentially one software application instead of on multiple applications installed on the end-users' personal computers. Security is also usually said to be enhanced with application servers, since an application server functions somewhat as a firewall, separating users from data stored in a database associated with the application server.

Application servers are often accessible by users using a web browser, such as Microsoft Internet Explorer or Mozilla Firefox, similar to the way Internet websites are accessed. An application server may have an Internet Protocol (IP) address and/or a nominal designator identifying it in a network, such as a LAN or the Internet. Many application servers provide a web-style user experience, such as by presenting information to users via HyperText Markup Language (HTML) pages and/or other technologies used on Internet websites. Such application servers often interact with users over a HyperText Transfer Protocol (HTTP).

Access to some application servers is limited to authorized users, or is wider and more permissive for authorized users, compared to unauthorized users. Users often utilize a set of credentials, such as a username and a password, to log in to application servers. Some application servers, such as Java-based application servers, may use a Java Authentication and Authorization Application Program Interface (JAAS) for handling user log in. Additionally or alternatively, authorized users may be recognized by an application server using their network identity, their computer identity and/or network address, such as an IP address.

An application server sometimes stores some or all of its pertinent data in an associated database, so that a separation is kept between the application server's business logic and its associated data. When a user interacts with an application server, the application server, in turn, often interfaces with its associated database for retrieving, storing, altering and/or otherwise handling data (hereinafter "database operations") required for serving the user. In many cases, the interface between an application server and a database is transparent to a user, who is only required to interact with the application server and not directly with the database. The application server, in turn, is usually the one interacting with the database on behalf of the user.

An application server often serves multiple users simultaneously but interacts with its associated database essentially over one connection path. This mode of operation is sometimes referred to as "connection pooling", since multiple user requests are united by the application server and sent over substantially one connection interface to the database. Connection between an application server and a database often involves the application server logging in to the database using a set of credentials, such as a username and a password, designated to the application server.

Reference is now made to FIG. 1A, which shows a first network diagram 100. First network diagram 100 includes a client 102, a rich client 104, an application server 106, a database 108 and a storage device 110. A combination of client 102, application server 106 and database 108 or storage device 110 is hereinafter referred to as a "three-tier topology", and a combination of rich client 104 and database 108 or storage device 110 is hereinafter referred to as a "two-tier topology".

Client 102 is optionally a computer, such as a personal computer (PC), a mobile computer, a Personal Digital Assistant (PDA), a mobile phone, or the like. The computer may function as a database, an application server, a terminal, and/or the like. Additionally or alternatively, the computer may function as and/or run a rich client software application, such as a Java client, which may be used for accessing application server 106. Client 102 is adapted to communicate with application server 106 through a communication channel, such as over a "closed" network like an internal office network or an "open" network such as the Internet. Rich client 104 is optionally a computer adapted to communicate with database 108 essentially directly, such as using a software application which stores some or all of its pertinent data in the database. In the foregoing description, the term "rich client" refers to either the computer, the software application installed on it, or both. Application server 106 is a computer adapted to serve at least one client 102 and to communicate with at least one database 108 over a communication channel. Storage device 110 may be a non-volatile memory or a computer comprising a non-volatile memory (such as a database, a storage server, or the like), adapted to receive data from application server 106 and/or rich client 104.

In an embodiment optionally involving a three-tier topology, information pertaining to a user (this information hereinafter referred to as a "user identifier" or simply an "identifier") of application server 106 is relayed to database 108 and/or to storage device 110. The term "user" may refer to a person using client 102 for communicating with application server 106, or to client 102 itself, communicating with application server 106 essentially automatically. The user identifier is optionally one or more of the following:

an IP address of client 102. An IP address is essentially a unique identifier of a computerized device on a network. IP addresses are currently mainly regulated according to Internet Engineering Task Force (IETF) standard RFC 791, entitled "Internet Protocol" (commonly referred to as "IPv4"), incorporated herein by reference. An IP address, according to the RFC 791 standard, comprises 32 bits, decimally shown as four groups of numbers between 0-255, divided by dots. For example, 255.0.17.198 may be an IP address. A newer version of IP which comprises 128 bits is defined in IETF standard 4291, entitled "IP Version 6 Addressing Architecture" (commonly referred to as "IPv6"), incorporated herein by reference. An IP address of client 102 is discoverable, for example, by utilizing a Request-.getRemoteIP( ) Java method, available in a Sun Microsystems Java Platform Enterprise Edition (commonly referred to as "Java EE") application server;

a name (which may contain letters, numerals, and/or other symbols) identifying client 102 in a network. For example, a Microsoft Windows Network computer name;

a username used by client 102 and/or a user of client 102 for accessing application server 106. Such a username is discoverable, for example, by utilizing a Request-.getRemoteUser( ) Java method, available in Java EE application servers;

a username used by client 102 and/or a user of client 102 for accessing a network, such as a network which enables its connection to application server 106 and/or a different network. Such a username may be available through a security protocol such as Kerberos, sometimes used by Microsoft Windows operating systems. For more information about the Kerberos protocol, see B. Clifford Neuman & Theodore Ts'o, *Kerberos: An Authentication Service for Computer Networks*, 32 IEEE Communications 9, 33 (1994) and Jason Garman, *Kerberos: The Definitive Guide* (2003), both incorporated herein by reference;

a Uniform Resource Locator (URL) of a web page served by application server 106 to client 102. A URL is a standardized reference to a networked resource, such as a web page, often found on the Web and on web-style applications, such as a possible implementation of application server 106. URLs are sometimes referred to as URIs (Uniform Resource Identifiers). Optionally, a URL relayed to database 108 is a URL of a web page on which an action by client 102 triggers a transaction request from application server 106 to database 108.

an HTTP request method associated with an interaction of client 102 with application server 106. HTTP request methods are defined in IETF standard RFC 2616, entitled "Hypertext Transfer Protocol—HTTP/1.1", incorporated herein by reference. An HTTP request method is essentially a request for information and/or for execution of an action, sent by a client to an HTTP server. For example, when a user on client 102 employs a web browser to connect to application server 106, the web browser may transparently interact with the application server using one or more HTTP request(s). An HTTP request method may be, for example, "OPTIONS", "GET", "HEAD", "POST", "PUT", "DELETE", "TRACE", and/or "CONNECT", all further explained in standard RFC 2616.

one or more environment variables associated with client 102. An environment variable may be, for example:

a "user-agent" string of a web browser used on client 102 for communicating with application server 106. A user-agent string is essentially an information package which may be sent by a web browser to a server with which it communicates. A user-agent string may reveal to a server various variables relating to the web browser and/or to a system on which the web browser runs. For example, a user-agent string of a Firefox web browser may be Mozilla/5.0 (Windows; U; Windows NT 5.1; en-US; rv:1.8.1.7) Gecko/20070914 Firefox/2.0.0.7. This exemplary user-agent string reveals variables like an operating system type ("Windows"), a main language of the web browser ("en-US"), a web browser type and version ("Firefox/2.0.0.7"), as well as other variables;

a screen resolution of client 102, which may be measured in pixels;

a window size of a software application (such as a web browser) used on client 102 for communicating with application server 106, which may be measured in pixels;

a window location of a software application (such as a web browser) used on client 102 for communicating with application server 106, which may be measured according to the window's offset from display boundaries; or a color depth of the display of client 102, which may be measured as a number of available colors.

In an embodiment involving a two-tier topology, at least one user identifier associated with rich client 104 is relayed to database 108 and/or to storage device 110. The term "user" may refer to a person using rich client 104 for communicating with database 108, or to a rich client 104 itself, communicating with database 108 essentially automatically. The user identifier is optionally similar to what is disclosed above, with necessary adaptations that will become clear to persons of skill in the art.

It should be noted that both in a two- and a three-tier topology, the term "user", which relates to an identifier of a user of the application server or the rich client, may also be regarded as an "end-user" of the database. That is, the user of the application server or the rich client indirectly uses the database, and is therefore an end-user of the database. In contrast, simply a "user" of the database may be regarded as the application server or the rich client, since they are the ones directly connecting to the database.

Figure 2:
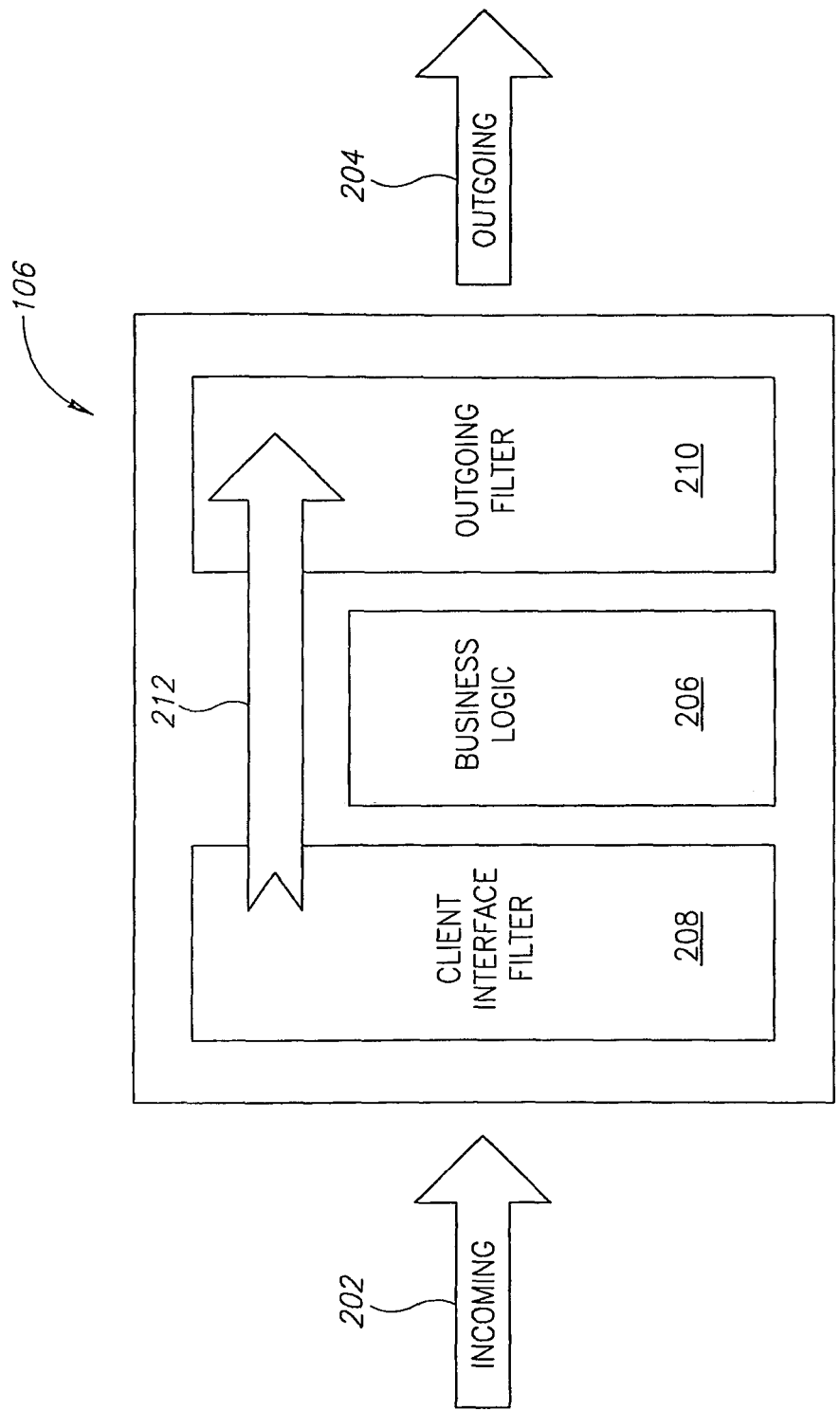
FIG. 2 schematically shows a block diagram, in accordance with an embodiment of the disclosure.

Reference is now made to FIG. 2, which shows a block diagram of application server 106, illustrating an exemplary embodiment of a user identifier relay from the application server to database 108 and/or to storage device 110 (of FIG. 1A). Application server 106 may be, for example, a Java EE application server; a Microsoft .NET ("dot net") application server; a web-oriented application server, such as WordPress, Joomla or Drupal; a SAP NetWeaver application server, or the like. Additional types of application servers are listed in The Server Side, Application Server Matrix (Mar. 27, 2005), and in Wikipedia, The Free Encyclopedia, Comparison of application servers, both incorporated herein by reference.

Application server 106 optionally includes a business logic core (hereinafter "business logic") 206. In an embodiment, it may further include a client interface filter (hereinafter "interface filter") 208 and an outgoing filter 210, each or both also referred to as "control logic".

Application server 106 may be adapted to receive at least one incoming request 202, such as from client 102 (of FIG. 1A), and to transmit at least one outgoing request 204, such as to database 108 and/or to storage device 110 (of FIG. 1A). Incoming request 202 may be a request of a user to perform data retrieval, storage, alteration and/or the like. Outgoing request 204 may be a request of application server 106 to perform operation(s) corresponding to the user's request(s) in database 108 (of FIG. 1A).

Business logic 206 is optionally a set of rules, procedures, algorithms and/or the like that essentially define a behavior of a software application, such as that of application server 106. By way of example, if application server 106 is a warehouse inventory management system, business logic 206 may include rules, procedures, algorithms and/or the like that essentially govern inventory classification, quota, location and so forth.

In an embodiment, interface filter 208 is adapted to identify, collect, catch and/or intercept (hereinafter jointly referred to as "intercept") at least one user identifier. For example, interface filter 208 may identify an IP address of a user communicating with application server 106. Optionally, when a user initially connects to application server 106, interface filter 208 stores the at least one user identifier in memory. Saving the at least one user identifier in memory may spare the need to repeatedly perform identification every time a same user, during essentially one session, interacts with application server 106. Optionally, interface filter 208 stores the at least one user identifier as one or more HTTP session(s) objects. An HTTP session is essentially a lasting connection between a client and a server, such as client 102 (of FIG. 1A) and application server 106, commonly involving an exchange of information and/or requests between the two. Optionally, interface filter 208 stores the at least one user identifier as a "cookie". A cookie (sometimes referred to as an "HTTP cookie" or a "web cookie") is essentially a data package sent by a server (such as application server 106) to a client (such as client 102 of FIG. 1A) and stored by the client's web browser. When the client connects to the server in the future, the stored cookie may be served for purposes such as authentication, tracking, shopping cart retention, and/or the like. For example, the cookie may be used to identify and authenticate the client in its future connections to the server, without the need to type a user name and a password again. Optionally, interface filter 208 stores the at least one user identifier in a Java Naming and Directory Interface (JNDI). JNDI is a component in Java EE application server, providing applications based on Java technology with an essentially unified interface to multiple naming and directory services. Using JNDI, applications based on Java technology can store and retrieve named Java objects of many types, such as client login information. JNDI may be used, for example, by a Java Authentication and Authorization Service (JAAS) optionally operating in conjunction with an Enterprise JavaBeans (EJB) component. JAAS is an optional component in Java EE application servers which may manage client login, authentication, sessions and/or the like. EJB is an optional server-side component in Java EE application servers, which may provide architecture for modular construction of enterprise applications.

Interface filter 208 may be essentially integrally formed with application server 106 or coupled to it, essentially without altering its core code. By way of example, if application server 106 is a Java EE application server, interface filter 208 may be coupled to the application server as a "Java EE filter". A "Java EE filter" is an optional, extended component of Java EE which may dynamically intercept requests and/or responses and transform and/or use the information contained in them. Java EE filters are further explained in Sun Microsystems, The Essentials of Filters, incorporated herein by reference. An example of implementing a user identifier intercepting filter in a Java EE enterprise server is available in Slavik Markovich, Propagating Middle-Tier and Application Users to the DBMS (Part 1 of 3), (May 22, 2007), and in Slavik Markovich, Propagating Middle-Tier and Application Users to the DBMS (Part 2 of 3), (Jun. 10, 2007), both incorporated herein by reference.

In another example, where application server 106 is a .NET application server, interface filter 208 may be implemented as a web module registered in the application server's configuration file (often called Web.config), so that the web module is called during web requests for intercepting data in the flow of these requests.

The web module may intercept data from, for example, one or more of the following:
 a user identity Application Program Interface (API) used in a .NET application, such as HttpApplication.Context.User.Identity;
 a parameter containing a user name (or any other user identifier) that is passed to the application server once a login form is submitted by the user.
 a previously-stored user name saved in a session object such as HttpApplication.Context.Session;
 an HTTP request object, such as HttpApplication.Request, that contains data pertaining to a request, like the requester's IP address, browser, requested URL and/or the like.

The user identifier intercepted by the web module may be stored, for example, in a thread static storage and/or in an object associated with the respective HTTP request, such as an HttpContext object.

The web module may be executed right before or upon initiation of a database connection by the .NET application. For example, an interceptor Dynamic Link Library (DLL) may be set, using .NET's profiling API, to rewrite a code of methods that perform database access. The rewritten code is optionally a Microsoft Intermediate Language (MSIL) code of the database access methods, such as System.Data.SqlClient.SqlCommand.ExecuteReader, System.Data.SqlClient.SqlCommand.Execute NonQuery and the like. The rewritten code of the database access methods may include a method that calls the web module. This way, every time a database access method is executed, the web module is called to intercept the user identifier.

In an embodiment, the at least one user identifier that is intercepted by interface filter 208 is conveyed 212 to outgoing filter 210. For example, in a Java EE application server, conveying 212 may be performed by storing the at least one user identifier in a ThreadLocal storage (sometimes referred to as "TLS") and having outgoing filter 210 essentially pull the at least one user identifier from the ThreadLocal. Optionally, conveying 212 may be performed by storing the at least one user identifier in a static hash map having a unique thread ID. A static hash map is a component that may exist in many application servers, such as, for example, a Java EE application server. It is essentially a data container which may be accessed using a unique thread ID. A thread is essentially a portion of a running computerized process. A thread may have a unique ID identifying it, which may enable direct access to it.

In a .NET application server, as another example, conveying 212 may be performed by pulling the user identifier from the thread static storage, the HttpContext object, and/or the like.

In an embodiment, outgoing filter 210 is optionally adapted to receive and/or pull the at least one user identifier that is intercepted by interface filter 208, and to attach it (or them) to a carrier transmitted to database 108 and/or to storage device 110 (of FIG. 1). Outgoing filter 210 may be essentially integrally formed with application server 106 or coupled to it essentially without altering its core code. Referring now to FIG. 1A, application server 106 may generally transmit one or more command(s) to a database, such as database 108, ordering it to retrieve, store, alter and/or otherwise handle data (such commands are also referred to as "transaction requests"). The at least one user identifier may be planted in such a transaction request or in a plurality of transaction requests, acting essentially as "carriers", sent from application server 106 to database 108 over an outgoing request 204 (of FIG. 2), so that they are received by the database and/or by storage device 110. The term "carrier", as referred to herein, may refer to any data that is being transmitted from the application server to the database, including any transmitted along with the actual description of the transaction being requested.

By way of example, if application server 106 is a Java EE application server, and database 108 is an Oracle database (such as Oracle 10g or Oracle 11g), the at least one user identifier may be implanted within one or more "End-To-End" information placeholders ("metrics") which may exist within a command. These information placeholders may be programmed, for example, using an Application Programming Interface (API) supported by the Oracle database. In current versions of Oracle, the information placeholders may be programmed using an API command OracleConnection.setEndToEndMetrics( ). The at least one user identifier may be implanted inside one, two or three information placeholders available using the Oracle API:

1. metrics[OracleConnection.END_TO_END_ACTION_INDEX]="user identifier 1"; This placeholder, which contains the phrase "user identifier 1" in this example, may contain up to 32 characters in Oracle 10g Release 2.

2. metrics[OracleConnection.END_TO_END_MODULE_INDEX]="user identifier 2"; This placeholder, which contains the exemplary phrase "user identifier 1", may contain up to 48 characters in Oracle 10g Release 2.

3. metrics[OracleConnection.END_TO_END_CLIENTID_INDEX]="user identifier 3"; This placeholder, which contains the exemplary phrase "user identifier 1", may contain up to 64 characters in Oracle 10g Release 2.

"End-To-End" metrics are further discussed in Venkatasubramaniam Iyer, Elizabeth Hanes Perry, Brian Wright & Thomas Pfaeffle, Oracle, End-To-End Metrics Support, Oracle Database JDBC Developer's Guide and Reference 10g Release 2, chapter 30 (January 2007), incorporated herein by reference.

As another example, if application server 106 is a .NET application server, the at least one user identifier may be planted within a connection object or any other connection property that is transmitted to the database. For example, the at least one user identifier may be set as a value of a context_info property of the connection object.

As yet another example, if application server 106 is of the type that uses SQL to format its database transactions, the at least one user identifier may be planted within the SQL query itself. This may be done, for instance, by adding the user identifier to the request as a note that is not interpreted by the database as a part of the actual transaction, but is still received by the database. A single-line note may be marked using a double dash (--) at its beginning, and a multi-line note may be marked with a /* sign at its beginning and a */ sign at its end. A note may also be marked differently.

Referring now back to FIG. 2, in an embodiment, interface filter 208 and outgoing filter 210 may be implemented as essentially one software module or one filter. In this one module or filter, which may also be jointly referred to as "control logic", at least one user identifier is intercepted and attached to a command sent to the database, such as database 108, and/or to storage device 110 (of FIG. 1A).

Figure 3:
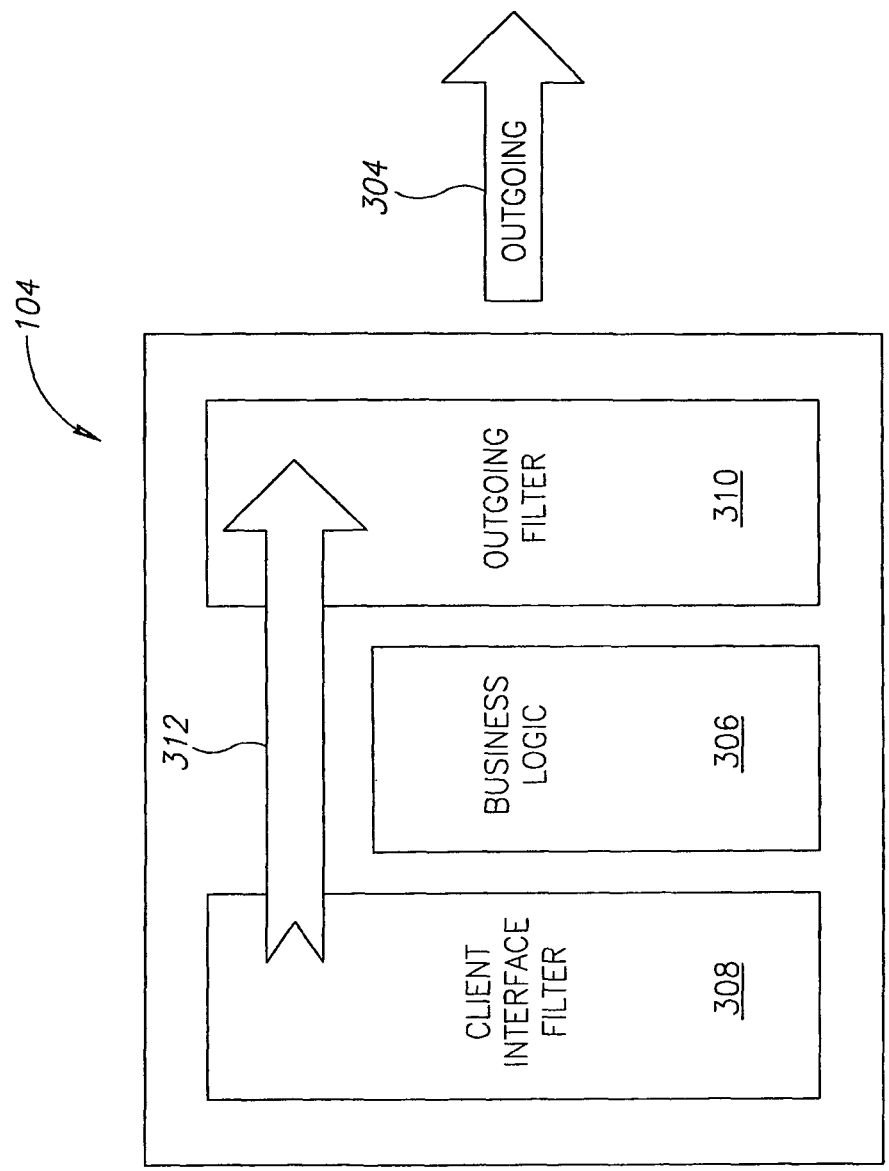
FIG. 3 schematically shows another block diagram, in accordance with an embodiment of the disclosure.

Reference is now intermittently made to FIG. 1A and to FIG. 3, which shows a block diagram of rich client 104, illustrating an exemplary embodiment of a user identifier relay from the rich client to database 108 and/or to storage device 110 (of FIG. 1A). Rich client 104 may comprise, for example, a Java, a Microsoft .NET ("dot net"), an Oracle Forms, and/or other one or more client platform(s).

Rich client 104 optionally includes a business logic core (hereinafter "business logic") 306, a client interface filter (hereinafter "interface filter") 308 and an outgoing filter 310, each or both also referred to as "control logic".

Rich client 104 is adapted to transmit at least one outgoing request 304 to database 108 (of FIG. 1A). Outgoing request 304 may be a request of a user of rich client 104 to perform data retrieval, storage, alteration and/or the like in database 108 (of FIG. 1A).

Business logic 306 is optionally a set of rules, procedures, algorithms and/or the like that essentially define a behavior of a software application, such as that of rich client 104. By way of example, if rich client 104 comprises a warehouse inventory management system, business logic 306 may include rules, procedures, algorithms and/or the like that essentially govern inventory classification, quota, location and so forth.

In an embodiment, interface filter 308 is adapted to identify, collect, catch and/or intercept (hereinafter jointly referred to as "intercept") at least one user identifier. For example, interface filter 308 may identify an IP address of rich client 104. Optionally, when a user initially starts working on rich client 104, interface filter 308 stores the at least one user identifier as one or more HTTP session(s) objects. Interface filter 308 may be essentially integrally formed with rich client 104 or coupled to it essentially without altering its core code. By way of example, if rich client 104 comprises a Java EE platform, interface filter 308 may be coupled to the rich client as a Java EE filter.

In an embodiment, the at least one user identifier that is intercepted by interface filter 308 is conveyed 312 to outgoing filter 310. For example, in a Java EE platform, conveying 312 may be performed by storing the at least one user identifier in a ThreadLocal storage and having outgoing filter 210 essentially pull the at least one user identifier from the ThreadLocal.

In an embodiment, outgoing filter 310 is optionally adapted to receive and/or pull the at least one user identifier that is intercepted by interface filter 308, and to attach it (or them) to a carrier transmitted to database 108 (of FIG. 1A). Outgoing filter 310 may be essentially integrally formed with application server 306 or coupled to it essentially without altering its core code. Referring now to FIG. 1A, rich client 104 may generally transmit one or more command(s) to a database, such as database 108, ordering it to retrieve, store, alter and/or otherwise handle data. The at least one user identifier may be planted in such a command or in a plurality of commands, acting essentially as "carriers", sent from rich client 104 to database 108 over an outgoing request 304 (of FIG. 3), so that they are received by the database.

By way of example, if rich client 104 comprises a Java EE platform, and database 108 is an Oracle database (such as Oracle 10 g or Oracle 11g), the at least one user identifier may be planted within one or more "End-To-End" information placeholders ("metrics") which may exist within a command.

Referring now back to FIG. 3, in an embodiment, interface filter 308 and outgoing filter 310 may be implemented as essentially one software module or one filter. In this one module or filter, at least one user identifier is intercepted and attached to a command sent to the database, such as database 108 (of FIG. 1A).

Figure 1B:
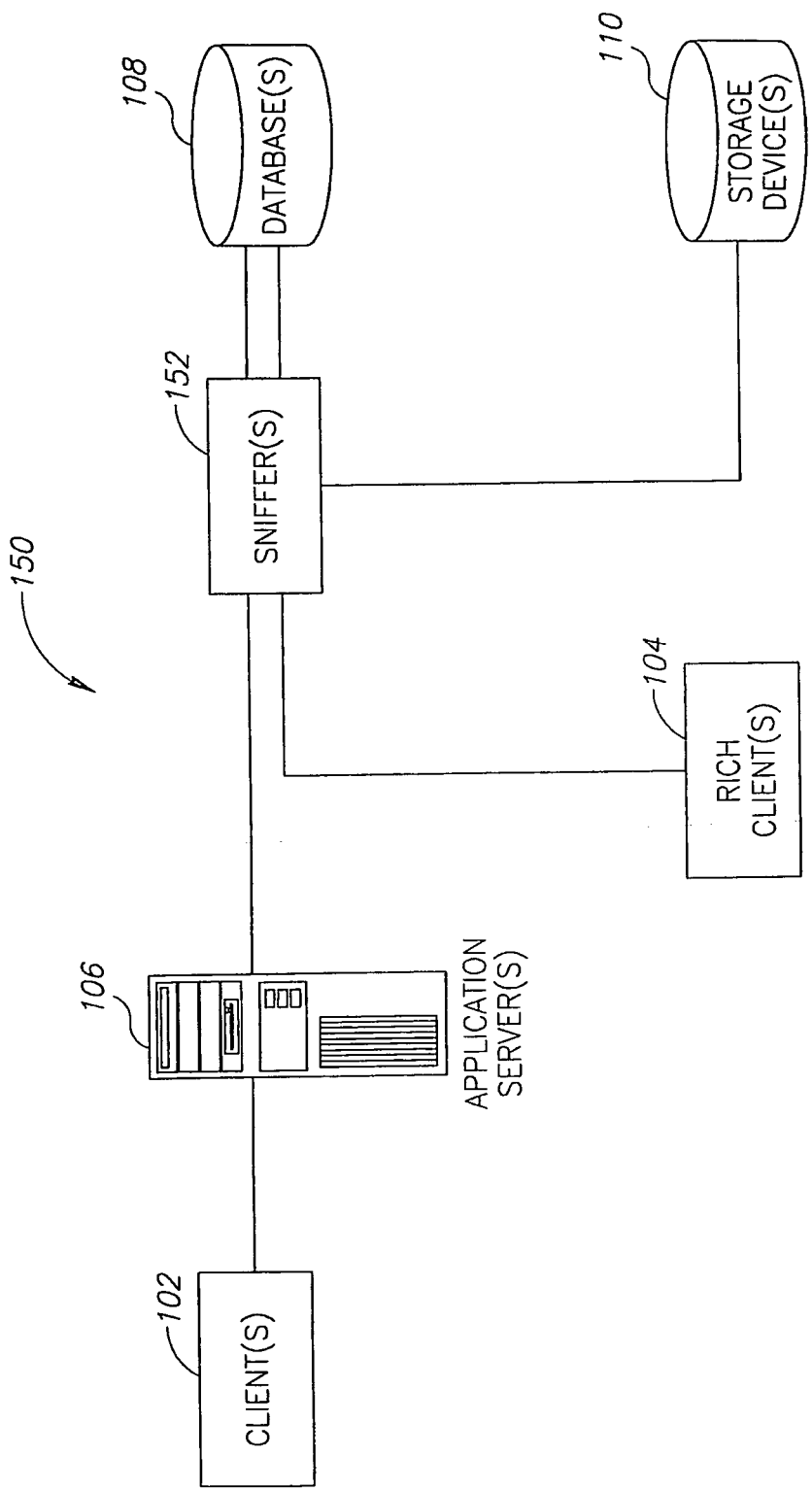
FIG. 1B schematically shows another network diagram, in accordance with an embodiment of the disclosure.

Reference is now made to FIG. 1B, which shows a second network diagram 150, according to an embodiment. Second network diagram 150 optionally includes elements similar or identical to those shown in FIG. 1A: Client 102, rich client 104, application server 106 and database 108. FIG. 1B further includes a sniffer 152, essentially positioned on a communication line connecting application server 106 and/or rich client 104 with database 108 (this communication line is hereinafter referred to as "COMM"). Alternatively, sniffer 152 may be positioned in a location enabling it to sense traffic flowing in COMM. Sniffer 152 is a computer software or a computer hardware (also known as a "network analyzer", a "protocol analyzer", an "Ethernet sniffer" or a "wireless sniffer") that can intercept and/or log traffic passing over a digital network or part of a network. For example, sniffer 152 may be implemented with network equipment such as a router or a switch, through which network traffic is flowing. Sniffer 152 may intercept one or more database command(s), user identifier(s) and/or user identifier(s) attached to carrier(s), which are essentially encompassed within network traffic. Intercepting may be performed without substantially harming the traffic flow beyond sniffer 152. Sniffer 152 may optionally store the intercepted object(s) in its internal memory. Additionally or alternatively, sniffer 152 may transmit the intercepted object(s) to storage device 110 which may, in turn, store them.

Figure 4:
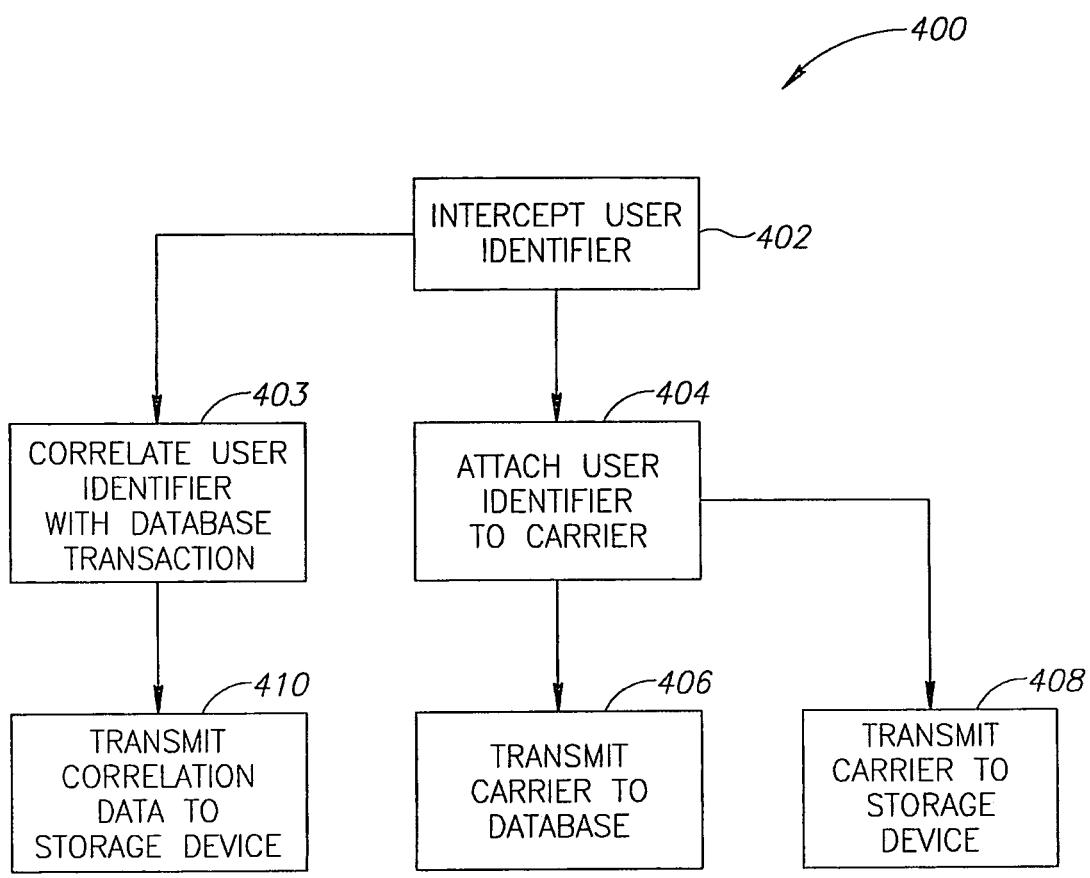
FIG. 4 schematically shows a flow chart, in accordance with an embodiment of the disclosure.

Reference is now made to FIG. 4, which shows a flow chart of an exemplary process 400 of relaying at least one user identifier from application server 106 or a rich client 104 to database 108 and/or to storage device 110 (of FIG. 1A).

In a block 402, at least one user identifier is optionally intercepted, such as by interface filter 208 (of FIG. 2) and/or by interface filter 308 (of FIG. 3). Optionally, the at least one user identifier is stored in an HTTP session, a cookie, a JNDI and/or a ThreadLocal storage.

In a block 404, the at least one user identifier is optionally attached to a carrier, such as a command to be transmitted from application server 106 or rich client 104 to database 108 (of FIG. 1A).

In an embodiment comprising essentially one filter or one software module acting as a combination of interface filter 208 or 308 and outgoing filter 210 or 310 (of FIGS. 2 and 3, respectively), operations of blocks 402 and 404 may be essentially performed by one software component.

In a block 406, the carrier, such as the database command, is optionally transmitted from application server 106 or rich client 104 to database 108 (of FIG. 1A).

In a block 408, the carrier, such as the database command, is optionally transmitted from application server 106 or rich client 104 to storage device 110 (of FIG. 1A).

In a block 403, the at least one user identifier is optionally correlated with a corresponding one or more database command. For example, a list may be created, including one or more user identifiers and their corresponding database commands.

In a block 410, the correlation data created in block 403, such as the list, is optionally transmitted to and/or stored by storage device 110 (of FIG. 1A).

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

What is claimed is:

1. A method for user identification, the method comprising relaying an identifier of a user of an application server to a database associated with the application server, wherein the relaying is performed via a transaction request transmitted from the application server to the database, based on a user request from said user to indirectly access the database via the application server, wherein the transaction request comprises a request to perform at least one operation selected from the group consisting of retrieving data from the database, storing data in the database, and altering data in the database, the relaying comprises operating an interface filter to intercept the identifier of the user and operating an outgoing filter to receive the identifier of the user from the interface filter and to attach the identifier of the user to the transaction request from the application server to the database, and wherein attaching the identifier to the transaction request comprises implanting the identifier in an end-to-end metric of the transaction request, implanting the identifier in a connection property of the transaction request, or implanting the identifier as a note in a Structured Query Language (SQL) query.

2. The method according to claim 1, wherein the identifier includes at least one element selected from the group consisting of an Internet Protocol (IP) address, a login name, a Uniform Resource Locator (URL), a HyperText Transfer Protocol (HTTP) request method, and a user environment variable.

3. At least one non-transitory storage medium having stored thereon instructions that, when executed by a machine cause the machine to:
operate an interface filter to intercept an identifier of a user of an application server based on one or more communications between the user and the application server; and
operate an outgoing filter to receive the identifier of the user from the interface filter and to attach the identifier of the user to a transaction request transmitted from the application server to a database associated with the application server based on a user request from said user to indirectly access the database via the application server, wherein the transaction request comprises a request to perform at least one operation selected from the group consisting of retrieving data from the database, storing data in the database, and altering data in the database, and wherein attaching the identifier to the transaction request comprises implanting the identifier in an end-to-end metric of the transaction request, implanting the identifier in a connection property of the transaction request, or implanting the identifier as a note in a Structured Query Language (SQL) query.

4. The at least one non-transitory storage medium according to claim 3, wherein the identifier includes at least one element selected from the group consisting of an Internet Protocol (IP) address, a login name, a Uniform Resource Locator (URL), a HyperText Transfer Protocol (HTTP) request method, and a user environment variable.

5. At least one non-transitory storage medium having stored thereon instructions that, when executed by a machine, cause the machine to:
log on to a database using credentials assigned to an application server;
establish a connection path from the application server to said database, the connection path configured to serve a plurality of users;
receive from a user of said plurality of users a request to perform a transaction on the database;
based on the request from the user, generate a transaction request to be provided to the database via said connection path, the transaction request comprising a request to perform at least one operation selected from the group consisting of retrieving data from the database, storing data in the database, and altering data in the database;
operate an interface filter to intercept an identifier of said user based on one or more communications between the user and the application server; and
operate an outgoing filter to receive the identifier of the user from the interface filter and to relay the identifier of said user to said database by attaching the identifier of said user to the transaction request, wherein attaching the identifier to the transaction request comprises implanting the identifier in an end-to-end metric of the transaction request, implanting the identifier in a connection property of the transaction request, or implanting the identifier as a note in a Structured Query Language (SQL) query.

6. The at least one non-transitory storage medium of claim 5, wherein said identifier comprises at least one element selected from the group consisting of an Internet Protocol (IP) address, a login name, a Uniform Resource Locator (URL), a HyperText Transfer Protocol (HTTP) request method, and a user environment variable.

7. The at least one non-transitory storage medium of claim 5, wherein attaching the identifier of said user to the transaction request comprises implanting said identifier in the end-to-end metric of said transaction request.

8. The at least one non-transitory storage medium of claim 5, wherein attaching the identifier of said user to the transaction request comprises implanting the identifier in the connection property of the transaction request.

9. The at least one non-transitory storage medium of claim 5, wherein attaching the identifier of said user to the transaction request comprises implanting the identifier as the note in a Structured Query Language (SQL) query.

10. The at least one non-transitory storage medium of claim 5, wherein the instructions are to cause the machine to attach the identifier of the user after generation of the transaction request.

11. At least one non-transitory storage medium having stored thereon instructions that, when executed by a machine cause the machine to:
operate a first logic component to logon to a database using credentials assigned to an application server, and to establish a connection path to said database, the connection path configured to serve a plurality of users, said first logic component to receive from a user of said plurality of users a request to perform a transaction on the database and, based on the request from the user, to generate a transaction request to be provided to the database via said connection path, the transaction request comprising a request to perform at least one operation selected from the group consisting of retrieving data from the database, storing data in the database, and altering data in the database; and
operate a second logic component to intercept an identifier of said user based on one or more communications between the user and the application server, and to relay the identifier of said user to said database by attaching the identifier of said user to the transaction request generated by the first logic component, operating the second logic component comprises operating a client interface filter component to intercept the identifier of said user, and operating an outgoing filter component to receive the identifier of said user from said client interface filter component, and to attach the identifier of said user to the transaction request generated by the first logic component.

12. The at least one non-transitory storage medium of claim 11, wherein said identifier comprises at least one element selected from the group consisting of an Internet Protocol (IP) address, a login name, a Uniform Resource Locator (URL), a HyperText Transfer Protocol (HTTP) request method, and a user environment variable.

13. The at least one non-transitory storage medium of claim 11, wherein attaching the identifier of said user to the transaction request comprises implanting said identifier in an end-to-end metric of said transaction request.

14. The at least one non-transitory storage medium of claim 11, wherein attaching the identifier of said user to the transaction request comprises implanting the identifier in a connection property of the transaction request.

15. The at least one non-transitory storage medium of claim 11, wherein attaching the identifier of said user to the transaction request comprises implanting the identifier as a note in a Structured Query Language (SQL) query.

* * * * *